United States Patent
Suzuki et al.

(10) Patent No.: US 6,458,486 B1
(45) Date of Patent: Oct. 1, 2002

(54) METHOD FOR PRODUCING NICKEL-HYDROGEN CELL

(75) Inventors: Hiroyuki Suzuki, Wako (JP); Kyoichi Ariga, Wako (JP); Naoya Goto, Koga (JP)

(73) Assignees: Honda Giken Kogyo Kabushiki Kaisha, Tokyo-to (JP); Sanoh Kogyo Kabushiki Kaisha, Koga (JP)

( * ) Notice: Subject to any disclaimer, the term of this patent is extended or adjusted under 35 U.S.C. 154(b) by 36 days.

(21) Appl. No.: 09/624,638

(22) Filed: Jul. 25, 2000

(30) Foreign Application Priority Data

Jul. 26, 1999 (JP) .......................... 11-210744

(51) Int. Cl.$^7$ ............................... H01M 4/58
(52) U.S. Cl. .............. 429/223; 429/209; 429/218.2; 29/623.1
(58) Field of Search ............ 429/209, 218.2, 429/223; 29/623.1

(56) References Cited

U.S. PATENT DOCUMENTS 4,716,088 A * 12/1987 Reichman et al. ........ 429/101

6,258,483 B1 * 7/2001 Abe .......................... 429/223

FOREIGN PATENT DOCUMENTS

| DE | 3150478 | 6/1983 |
| EP | 0780919 | 6/1997 |

* cited by examiner

Primary Examiner—Carol Chaney
Assistant Examiner—Dah-Wei D. Yuan
(74) Attorney, Agent, or Firm—Ladas & Parry

(57) ABSTRACT

Since it is possible to optionally adjust the used region of a negative electrode, it is possible to obtain a cell having an excellent balance of durability and discharge characteristic, and it is possible to reduce the resistance of a positive electrode. If only the positive electrode is charged before assembling the cell, it is possible to optionally adjust the used region of the negative electrode, so that it is possible to obtain the cell having the excellent balance of durability and discharge characteristic. Also after a large number of charge and discharge cycles are repeated, it is possible to suppress the internal pressure rise of the cell at the last stage of charge. In addition, it is possible to form a good cobalt conductive network on the active material of the positive electrode, and it is possible to reduce the resistance of the positive electrode.

21 Claims, 3 Drawing Sheets

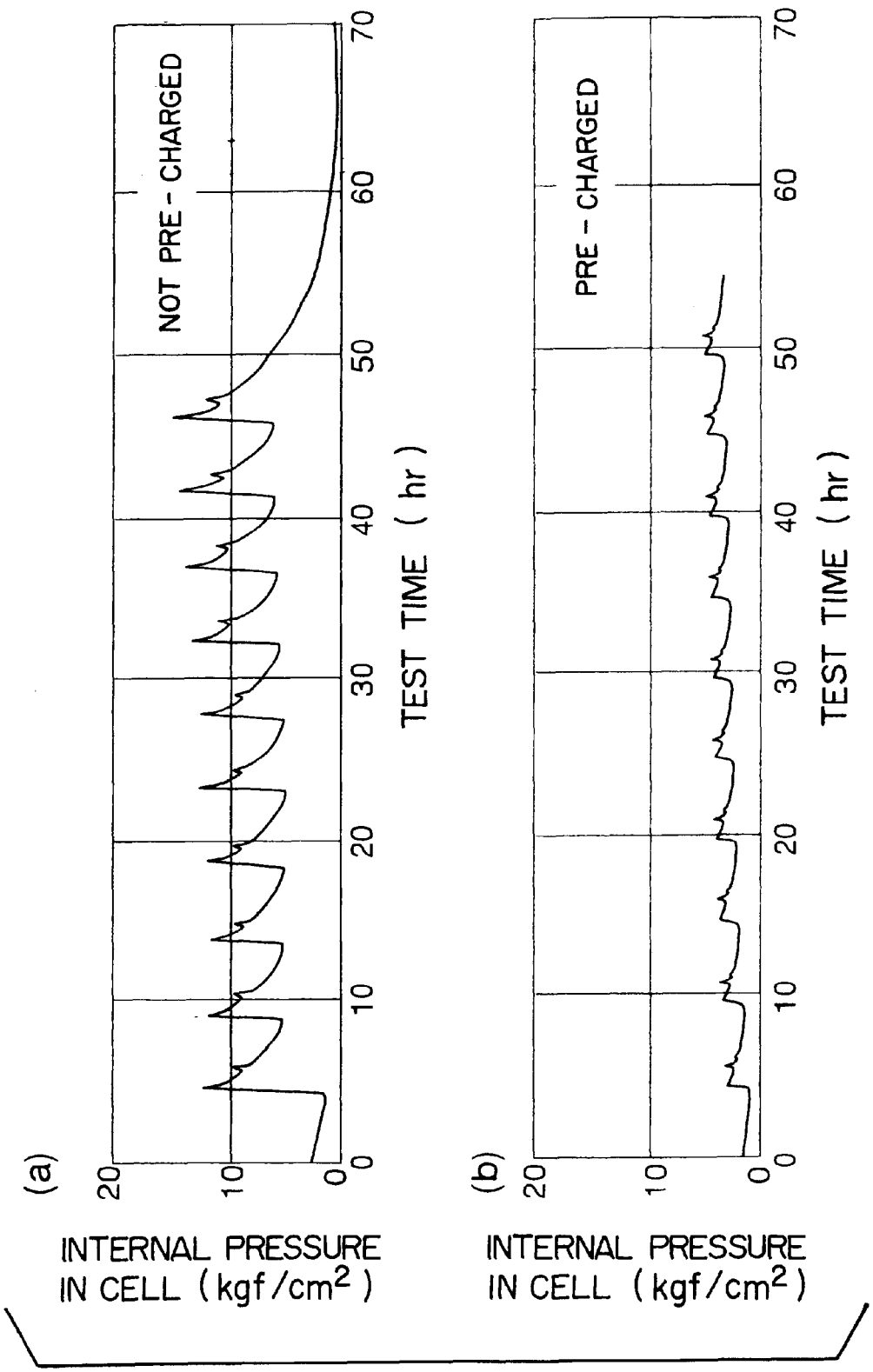
F I G. 1

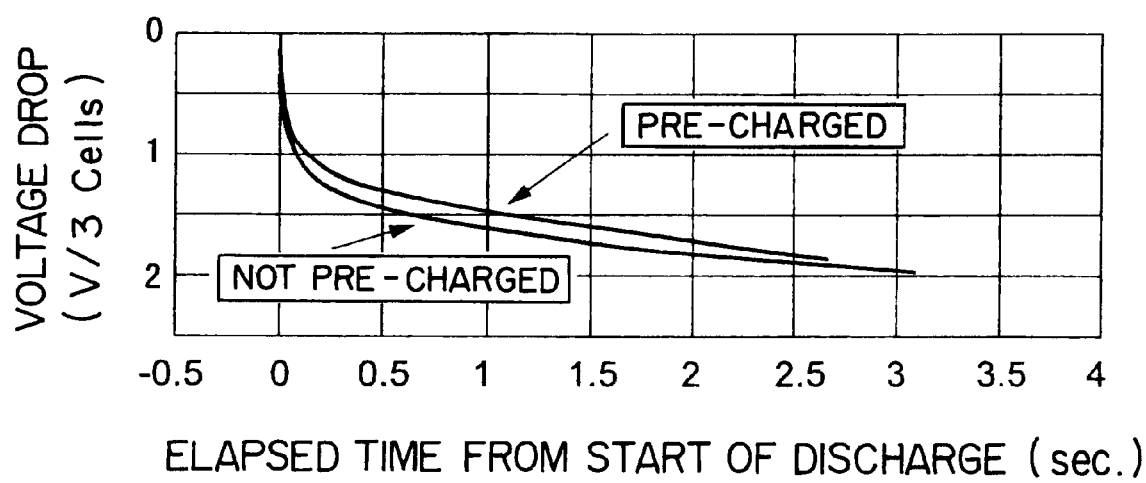
F I G. 4

METHOD FOR PRODUCING NICKEL-HYDROGEN CELL

BACKGROUND OF THE INVENTION

1. Field of The Invention

The present invention relates generally to a method for producing a nickel-hydrogen cell.

2. Description of Related Background Art

In the positive electrode of a typical alkaline secondary cell, $Ni(OH)_2$ is used as a reaction active material, and Co, CoO, $Co(OH)_2$ and so forth are used as conductive materials. In a cell can, the metallic cobalt and cobalt compound contained in the positive electrode react with hydroxide ions, which are contained in an electrolyte, to form water soluble cobalt complex ions $HCoO_2^-(CoOOH^-)$ to diffuse. By charging the positive electrode in this state, high conductive CoOOH is deposited on the surface of $Ni(OH_2)$ of the positive electrode to form a network of a so-called cobalt conductive matrix (a conductive network), so that it is possible to improve the coefficient of use of the active material.

However, if the above described process for forming the conductive network is carried out in the cell can after assembling the cell, charge is started on the condition that the dissolved amount of $HCoO_2^-$ is small since the amount of the electrolyte in the cell can is small. For that reason, CoOOH having a bad solubility is deposited on $Co(OH)_2$ and so forth, which should naturally dissolve in the electrolyte (if the amount of the electrolyte is sufficient), so that there is a problem in that it is not possible to sufficiently use the conductive material, such as $Co(OH)_2$.

In addition, if the process for forming the conductive network in the cell can, the same quantity of electricity as that charged to Co, which does not serve as the active material of the positive electrode for practical use, is charged to the negative electrode, so that the same quantity of discharge reserve capacity at that charged to the conductive material of the positive electrode is formed when the formation of the cell is completed. Therefore, the used region of the negative electrode increases by the increase of the discharge reserve capacity of the negative electrode, so that the charge reserve capacity of the negative electrode decreases. For that reason, there are problems in that the number of cycles decreases until the charge reserve capacity of the negative electrode is lost due to the deterioration of the negative electrode and that the internal pressure rises at the last stage of charge when the negative electrode is deteriorated. In order to solve these problems, it is considered to adopt, for example, a technique for decreasing the amount of the conductive material or a technique for enhancing the proportion of $Co(OH)_2$ that the quantity of electricity required to change to CoOOH is small. However, these techniques can cope with both of the formation of a good conductive network and the suppression of the used region of the negative electrode.

In addition, as a technique for forming a conductive network, there is also known a method for soaking $Ni(OH)_2$ powder in a sufficient amount of alkaline solution, in which metallic cobalt or a cobalt salt is dissolved, before a paste is produced, to deposit CoOOH in this state. This method can solve the problem of the dissolved amount of $HCoO_2^-$. However, there is a problem in that the conductivity between $Ni(HO)_2$ powders and between $Ni(OH)_2$ powder and a collector is lowered after filling the collector with a paste of an active material to produce an electrode.

SUMMARY OF THE INVENTION

It is therefore an object of the present invention to eliminate the aforementioned problems and to provide a method for ensuring a right used region of a negative electrode and for forming a good cobalt conductive network in a positive electrode.

In order to accomplish the aforementioned and other objects, according to one aspect of the present invention, there is provided a method for producing a nickel-hydrogen cell, wherein a paste type positive electrode containing $Ni(OH)_2$ as a reaction active material is charged to deposit CoOOH on the surface of $Ni(OH)_2$ before the assembly of a cell is completed after the reaction active material is held by a collector.

That is, according to the present invention, it is possible to form the optimum conductive network by pre-charging a positive electrode while soaking the positive electrode in a sufficient amount of electrolyte before assembling a cell (before filling the positive electrode, together with a negative electrode and the, electrolyte, in a cell can) after pasting a reactions active material $Ni(OH)_2$ to fill or apply the reaction active material in or on a collectors to cause the collector to hold the reaction active material (after forming the electrodes). In addition, since CoOOH is deposited on the electrode serving as thee final form, it is possible to obtain a stronger mechanical binding capacity and a higher conductivity than those of conventional electrodes.

In addition, if pre-charge is carried out according to the present invention, unlike if a cell is assembled without carrying out pre-charge, a charge of electricity corresponding to a charge of electricity given to Co, CoO and $Co(OH)_2$ is not given to a negative electrode when the formation is completed, so that it is possible to control the used region of the negative electrode so that the used region is a right range.

The pre-charge conditions include the charge of the capacity of the positive electrode at a constant current of 0.05 CA to 0.2 CA (1/20 to 1/5 CA) or at a constant, voltage according thereto. If the current is too high, the formation of CoOOH is not enough, so that $Ni(OH)_2$ is charged or gas is produced (the efficiency of the formation of CoOOH is lowered), and if the current is too low, the productivity is lowered. In view of them, the optimum current is about 0.1 CA (1/10 CA).

The pre-charge may be carried out by any one of the following two techniques:

(1) A technique for mixing at least one of Co, CoO and $Co(OH)_2$ powders, Ni $(OH)_2$ powder, and an additive, such as a suitable binder, to prepare a paste, filling or applying the paste in or on a collector to form a positive electrode, and then, soaking the positive electrode in a vessel, in which an electrolyte is housed, to charge the positive electrode; and (2) A technique for mixing $Ni(OH)_2$ powder with an additive, such as a suitable binder, to prepare a paste, filling or applying the paste in or on a collector to form a positive electrode, and then, soaking the positive electrode in a vessel housing therein an electrolyte, in which a cobalt compound, such as metallic cobalt or a cobalt salt, is dissolved therein, to charge the positive electrode.

Furthermore, the present invention can be applied regardless of the kind of the negative electrode. That is, the negative electrode may be made of any one of rare earth or Laves hydrogen absorbing alloys.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 1(a) and 1(b) are graphs showing the variation in internal pressure of a cell in a cycle test, wherein FIG. 1(a) shows the variation with respect to a cell which has not been pre-charged (Comparative Example), and FIG. 1(b) shows the variation with respect to a cell which has been pre-charged (The Present Invention);

FIGS. 2(a) and 2(b) are graphs showing the variation in discharge capacity in a cycle test, wherein FIG. 2(a) shows the variation with respect to a cell which has not been pre-charged (Comparative Example), and FIG. 2(b) shows the variation with respect to a cell which has been pre-charged (The Present Invention);

FIGS. 3(a) and 3(b) are graphs showing the variation in discharge capacity in a cycle test, wherein FIG. 3(a) shows the variation with respect to a cell which has not been pre-charged (Comparative Example), and FIG. 3(b) shows the variation with respect to a cell which has been pre-charged (The Present Invention); and FIG. 4 is a graph showing the variation in terminal voltage in a high discharge test as compared in accordance with the presence of pre-charge.

DESCRIPTION OF THE PREFERRED EMBODIMENTS

Figure 2:
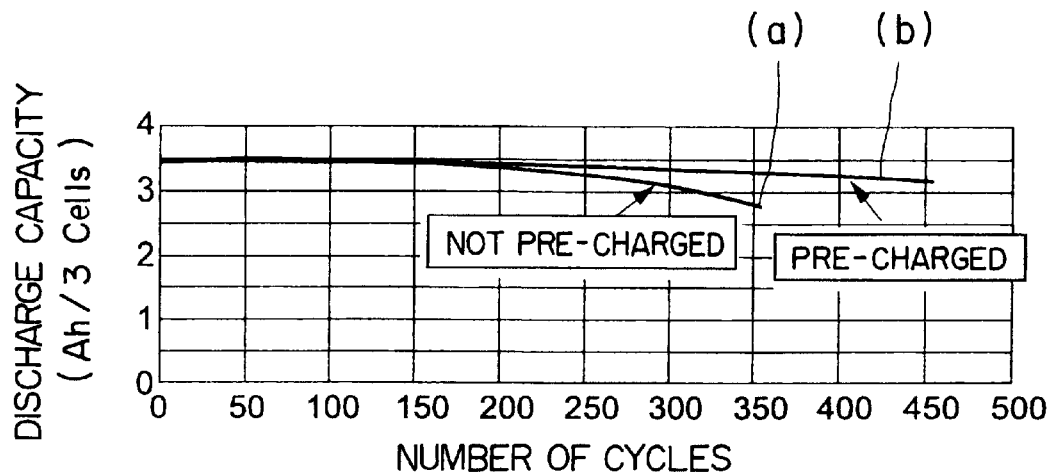

Referring now to the accompanying drawings, the preferred embodiment of the present invention will be described in detail below.

First, 100 parts by weight of $Ni(OH)_2$ powder serving as an active material was mixed with 5 parts by weight of Co powder and 6 parts by weight of CoO powder which serve as conductive materials. This mixture was mixed with aqueous PVA (polyvinyl alcohol) solution and ethanol to prepare a paste. This paste was filled in a foam metal of Ni to be dried to obtain a positive electrode.

The positive electrode obtained in the above described process was soaked in a treatment vessel, which is filled with 30% aqueous KOH solution (an alkaline electrolyte), to be pre-charged with a quantity of electricity required to change all of additives, such as Co, to CoOOH at a charging current of 0.1 CA (a constant current) corresponding to 1 cell, As a counter electrode for the pre-charge, an Ni plate was used. In addition, a comparative sample was prepared without carrying out the pre-charge.

Then, after a Laves hydrogen absorbing alloy represented by the general formula $Zr_{27}Ti_{19}Ni_{38}V_5Mn_{16}Co_5$ was ground, the resulting powder was passed through a sieve of 200 meshes to obtain a hydrogen absorbing alloy powder having a predetermined grain size. This hydrogen absorbing alloy powder was stuck on an expanded metal of Ni at an amount of 250 to 400 $g/m^2$ to be rolled, and then, sintered to obtain a negative electrode.

The positive and negative electrodes thus obtained were wounded via a separator to be inserted into a cell can, and an alkaline electrolyte is filled therein. Thereafter, the cell can was sealed to assemble a cell. As the alkaline electrolyte, 30% aqueous KOH solution was used. Furthermore, the designed capacity of the cell was set to be 4.0 Ah.

The test results carried out with respect to the cell obtained by the above described process will be described below.

[Test 1]

The cell obtained by the above described process was alternately charged and discharged in 6 cycles on the charge condition of 0.1 CA×11 hrs and on the discharge condition of 0.33 CA (⅓ CA) to 0.9 V to be activated. Thereafter, a module was formed by three cells to carry out a cycle test for alternately repeating charge and discharge on the following conditions at an ambient temperature of 40° C.

Charge Condition: 0.5 CA (½ CA) to $-\Delta V$

Discharge Condition: 5 CA to 2.7 V/module (0.9 V/cell)

FIG. 1 shows the variation in internal pressure of the cells with the progress of cycles. As shown in FIG. 1, there is a tendency for the internal pressure of the cell, which has not been pre-charged, at the last stage of charge to gradually increase as the number of cycles increases, whereas there is hardly such a tendency for a cell which has been pre-charged. In addition, the internal pressure (about 5 $kgf/cm^2$) of the cell, which has been pre-charged, at the last stage of charge is lower than the internal pressure (10 to 15 $kgf/cm^2$) of the cell which has not been pre-charged, regardless of the number of cycles.

FIG. 2 shows the variation in discharge capacity with the progress of cycles. As shown in FIG. 2, the decrease of the discharge capacity as the increase of the number of cycles with respect to the cell which has been pre-charged is smaller than that with respect to the cell which has not been pre-charged.

Figure 3:
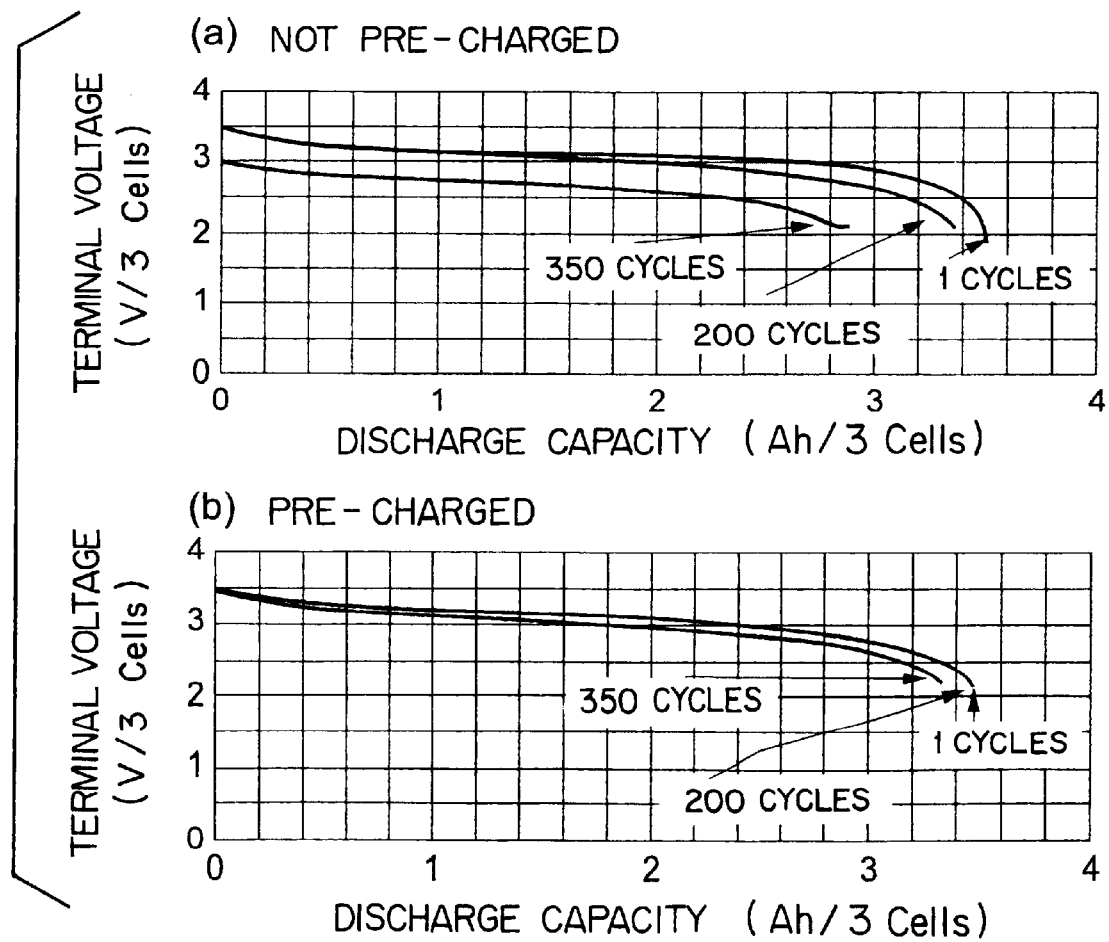

FIG. 3 is a graph showing the variation in discharge characteristic with the progress of cycles, particularly with respect to the discharge characteristic in the first cycle, the two-hundredth cycle, and the three-hundred and fiftieth cycle. As described above, this test was carried out by the discharge of 5 CA. Therefore, the graph of FIG. 3 shows the variation in high discharge characteristic with the progress of cycles. As shown in FIG. 3, the lowering rates of the discharge capacity and terminal voltage with respect to the cell, which has been pre-charged, are far smaller than that which has not been pre-charged, so that it can be seen that the cycle characteristics are improved by the pre-charge.

[Test 2]

A cell which has been pre-charged, and a cell which has not been pre-charged, were prepared by the same producing process as that for the tested cells. These cells were alternately charged and discharged in 6 on the charge condition of 0.1 CA×11 hrs and on the discharge condition of 0.33 CA to 0.9 V to be activated. The cells were completely charged out on the charge condition of 0.5 CA to $-\Delta V$.

Thereafter, a high discharge test was carried out at an ambient temperature of 0° C. The results are shown in FIG. 4. As shown in FIG. 4, it can be seen that the IR drop is smaller and the internal resistance of the cell is lower, with respect to the cell which has been pre-charged.

As described above, according to the present invention, it is possible to optionally adjust the used region of the negative electrode, so that it is possible to easily obtain a cell having an excellent balance of durability and discharge characteristic. In addition, it is possible to reduce the resistance of the positive electrode.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for producing a nickel-hydrogen cell, which comprises a pre-charge step of charging a paste positive electrode containing $Ni(OH)_2$, as a reaction active material to deposit CoOOH on the surface of $Ni(OH)_2$ before the assembly of a cell is completed but after the reaction active material is held on a collector wherein said pre-charge step is done between said paste positive electrode and a counter electrode, said counter electrode being different from a negative electrode, said negative electrode being for assembly within a can for said cell together with said paste positive electrode.

2. A method for producing a nickel-hydrogen cell as set forth in claim 1, wherein said pre-charge step charges the capacity of said positive electrode at a constant current of 0.05 CA to 0.2 CA (1/20 to 1/5 CA) or at a constant voltage according thereto.

3. A method for producing a nickel-hydrogen cell as set forth in claim 2, wherein said paste positive electrode is formed by mixing at least one of Co, CoO and $Co(OH)_2$ powders, $Ni(OH)_2$ powder, and an additive or binder to prepare a paste and filling or applying said paste in or on a collector.

4. A method for producing a nickel-hydrogen cell as set forth in claim to 3, wherein said paste positive electrode is formed by mixing $Ni(OH)_2$ powder with an additive or binder to prepare a paste and filling or applying said paste in or on a collector.

5. A method for producing a nickel-hydrogen cell as set forth in claim 4, wherein said pre-charge step charges said paste positive electrode.

6. A method for producing a nickel-hydrogen cell as set forth in claim 5, wherein said counter electrode is a Ni plate.

7. A method for producing a nickel-hydrogen cell as set forth in claim 3, wherein said pre-charge step charges said paste positive electrode.

8. A method for producing a nickel-hydrogen cell as set forth in claim 7, wherein said counter electrode is a Ni plate.

9. A method for producing a nickel-hydrogen cell as set forth in claim 7, wherein said counter electrode is outside of said can.

10. A method for producing a nickel-hydrogen cell as set forth in claim 2, wherein said paste positive electrode is formed by mixing $Ni(OH)_2$ powder with an additive or binder to prepare a paste and filling or applying said paste in or on a collector.

11. A method for producing a nickel-hydrogen cell as set forth in claim 2, wherein said counter electrode is a Ni plate.

12. A method for producing a nickel-hydrogen cell as set forth in claim 1, wherein said paste positive electrode is formed by mixing at least one of Co, CoO and $Co(OH)_2$ powders, $Ni(OH)_2$ powder, and an additive or binder to prepare a paste and filling or applying said paste in or on a collector.

13. A method for producing a nickel-hydrogen cell as set forth in claim 12, wherein said pre-charge step charges said paste positive electrode.

14. A method for producing a nickel-hydrogen cell a set forth is claim 13, wherein said counter electrode is a Ni plate.

15. A method for producing a nickel-hydrogen cell as set forth in claim 12, wherein said paste positive electrode is formed by mixing $Ni(OH)_2$ powder with an additive or binder to prepare a paste and filling or applying said paste in or on a collector.

16. A method for producing a nickel-hydrogen cell as set forth in claim 12, wherein said counter electrode is a Ni plate.

17. A method for producing a nickel-hydrogen cell as set forth in claim 1, wherein said paste positive electrode is formed by mixing $Ni(OH)_2$ powder with an additive or binder to prepare a paste and filling or applying said paste in or on a collector.

18. A method for producing a nickel-hydrogen cell as set forth in claim 17, wherein said pre-charge step charges said paste positive electrode.

19. A method for producing a nickel-hydrogen cell as set forth in claim 17, wherein said counter electrode is a Ni plate.

20. A method for producing a nickel-hydrogen cell as set forth in claim 1, wherein said counter electrode is a Ni plate.

21. A method for producing a nickel-hydrogen cell as set forth in claim 1, wherein said counter electrode is outside of said can.

* * * * *

UNITED STATES PATENT AND TRADEMARK OFFICE
CERTIFICATE OF CORRECTION

PATENT NO.     : 6,458,486 B1
DATED          : October 1, 2002
INVENTOR(S)    : Hiroyuki Suzuki et al.

It is certified that error appears in the above-identified patent and that said Letters Patent is hereby corrected as shown below:

<u>Title page,</u>
Item [*], "36" should read -- 69 --.

Signed and Sealed this

Third Day of December, 2002

JAMES E. ROGAN
*Director of the United States Patent and Trademark Office*